(12) United States Patent
Desai

(10) Patent No.: US 12,499,059 B2
(45) Date of Patent: *Dec. 16, 2025

(54) METHODS FOR CACHE INSERTION AND CACHE EVICTION IN A CACHE SYSTEM THAT INCLUDES A REVERSE CACHE AND A MAIN CACHE

(71) Applicant: Dell Products L.P., Round Rock, TX (US)

(72) Inventor: Keyur B. Desai, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,246

(22) Filed: Apr. 24, 2024

(65) Prior Publication Data

US 2024/0273037 A1 Aug. 15, 2024

Related U.S. Application Data

(63) Continuation of application No. 17/663,809, filed on May 17, 2022, now Pat. No. 12,105,639.

(51) Int. Cl.
*G06F 12/128* (2016.01)
*G06F 12/0891* (2016.01)
*G06F 12/123* (2016.01)

(52) U.S. Cl.
CPC ........ *G06F 12/128* (2013.01); *G06F 12/0891* (2013.01); *G06F 12/123* (2013.01)

(58) Field of Classification Search
CPC ............. G06F 12/0888; G06F 12/0891; G06F 12/0897; G06F 12/122; G06F 12/123; G06F 12/127; G06F 12/128; G06F 2212/1016; G06F 2212/1044
See application file for complete search history.

(56) References Cited

U.S. PATENT DOCUMENTS

| | | |
|---|---|---|
| 8,713,261 B1 | 4/2014 | Aharoni et al. |
| 8,924,647 B1 | 12/2014 | Evans |
| 9,569,367 B1 | 2/2017 | Wigmore et al. |
| 9,582,421 B1 | 2/2017 | Agarwala et al. |
| 9,921,963 B1 | 3/2018 | Li et al. |
| 9,990,301 B1 | 6/2018 | Kanaujia et al. |
| 11,599,462 B1 | 3/2023 | Hawkins |

(Continued)

OTHER PUBLICATIONS

John L. Hennessy and David A. Patterson, Computer Architecture: A Quantitative Approach, 2019, Morgan Kaufmann, Sixth Edition, Appendix pp. B13 and B39 (Year: 2019).

*Primary Examiner* — Aracelis Ruiz
(74) *Attorney, Agent, or Firm* — Workman Nydegger

(57) ABSTRACT

A cache system that includes a reverse cache and a main cache is disclosed. The reverse cache is configured to identify candidates for insertion into a main cache. The reverse cache stores entries such as fingerprints and index values, which are representations of or that identify data. When the entry has been accessed multiple times or is a candidate for promotion based on operation of the reverse cache, data corresponding to the entry is promoted to the main cache. The main cache is configured to evict entries using recency, frequency, and time-adjustments. The main cache and the reverse cache may be similarly configured with a recent list and a frequent list but operate differently.

19 Claims, 10 Drawing Sheets

(56) References Cited

U.S. PATENT DOCUMENTS

| | | |
|---|---|---|
| 11,650,934 B1 | 5/2023 | Desai et al. |
| 11,669,449 B1 | 6/2023 | Desai et al. |
| 2006/0143393 A1 | 6/2006 | Petev et al. |
| 2008/0059707 A1 | 3/2008 | Makineni et al. |
| 2012/0137081 A1 | 5/2012 | Shea |
| 2012/0221774 A1 | 8/2012 | Atkisson et al. |
| 2012/0254543 A1* | 10/2012 | Sintorn ............... H04L 67/5683 711/E12.025 |
| 2013/0227218 A1 | 8/2013 | Chang et al. |
| 2014/0115244 A1 | 4/2014 | Maybee et al. |
| 2016/0062916 A1 | 3/2016 | Das et al. |
| 2017/0031823 A1 | 2/2017 | Ross et al. |
| 2017/0235681 A1 | 8/2017 | Kaburaki et al. |
| 2017/0329720 A1 | 11/2017 | Bedi et al. |
| 2018/0275899 A1 | 9/2018 | Munsil et al. |
| 2020/0213627 A1 | 7/2020 | Ra et al. |
| 2020/0225868 A1 | 7/2020 | Dalmatov et al. |
| 2021/0263862 A1 | 8/2021 | Gupta et al. |
| 2023/0251965 A1 | 8/2023 | Desai |
| 2023/0251966 A1 | 8/2023 | Desai |
| 2023/0305958 A1 | 9/2023 | Desai et al. |
| 2023/0333985 A1 | 10/2023 | Desai |

\* cited by examiner

METHODS FOR CACHE INSERTION AND CACHE EVICTION IN A CACHE SYSTEM THAT INCLUDES A REVERSE CACHE AND A MAIN CACHE

FIELD OF THE INVENTION

Embodiments of the present invention generally relate to caching in computing systems. More particularly, at least some embodiments of the invention relate to systems, hardware, software, computer-readable media, and methods for inserting data into caches in computing systems.

BACKGROUND

In computing systems, data is often stored on a storage device such as a hard drive. When data is needed, the hard drive is accessed to retrieve and use the data. In order to improve this process, a cache may be used. A cache is typically implemented in a memory that is faster than the hard drive. Data from the hard drive can be cached in the cache and accessed more quickly. As a result, the cache tends to improve the performance of computing system at least by avoiding the need to access the hard drive for data that has been cached.

The size of the cache, however, is usually limited or fixed in size and is typically smaller in capacity than the hard drive. As a result, some of the data needed by an application may not be present in the cache and, if requested from the cache, results in a cache miss. To improve performance and improve a cache hit ratio, there is a desire to store data that will be accessed or used in the cache. For example, it may be more useful to cache data that is used or accessed several times compared to caching data that is only used once or twice. Conventionally, this is achieved using various eviction policies. Generally, the goal of eviction policies is to evict data that is accessed less frequently than other data in the cache. In addition to evicting data, inserting data into a cache can also impact performance. Data that is used once and inserted into the cache may not be accessed again. As a result, the data simply consumes space that could be better used.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to caches, caching systems and caching operations. More particularly, at least some embodiments of the invention relate to systems, hardware, software, computer-readable media, and methods for caching operations including cache entry operations, cache management operations, cache control operations, cache insertion operations and/or cache eviction operations.

Effective cache eviction and/or insertion operations can improve the performance of a cache, of applications that use the cache, and the operation of the computing system. Embodiments of the invention relate to caching operations such that items that are most recently used and/or most frequently used are inserted into the cache. Embodiments of the invention include a gateway cache or a reverse cache that can be used to determine how and which data is inserted into a main cache. By inserting data into the cache in a more considered manner, the data in the cache is more likely to be accessed and, as a result, a cache hit ratio is improved, thereby improving performance of the computing system.

Embodiments of the invention relate to a reverse cache that is described in the context of various caching methodologies including methodologies based on frequency such as least frequently used (LFU), methodologies based on recency such as least recently used (LRU), and methodologies based on time. By way of example and without limitation, recency refers to when an entry was accessed relative to other entries, and frequency refers to how many times an entry has been accessed. Frequency may also include aspects of recency. Time refers to how long an entry has been in the cache. Embodiments of the invention further relate to using a reverse cache in conjunction with a main cache. The reverse cache may implement entry criteria that determines which entries are promoted from the reverse cache into the main cache. The entry criteria are based on recency, frequency, and/or time. Evictions from the main cache may be managed based on recency, frequency, and/or time.

Embodiments of the invention are also disclosed in the context of an adaptive replacement cache (ARC). ARC is a method of cache management that uses both recency and frequency. Prior to describing the operation of a reverse cache, the operation of an example cache that includes aspects of embodiments of the invention is disclosed.

Figure 1A:
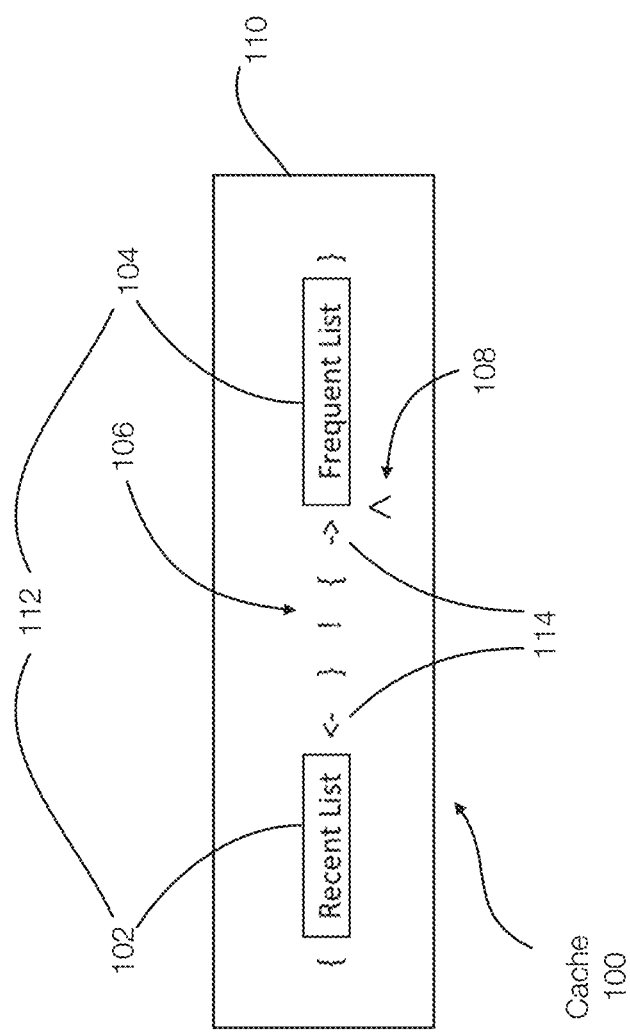
FIG. 1A discloses aspects of a cache such as an adaptive replacement cache.

FIG. 1A discloses aspects of an adaptive replacement cache. The adaptive replacement cache or cache 100 typically has a fixed size, represented by the box 110. The contents or data stored in the cache 100 is represented by an entry list 112. The entry list 112 includes a recent list 102 and a frequent list 104. The recent list 102 is configured to store entries with respect to recency and the frequent list 104 is configured to store entries with respect to frequency.

The top of the list 102 and the top of the list 104 are associated with a marker 106 (illustrated as an "!"). The marker 108 (illustrated as an "^"), represents a target size for the recent list 102 (or the frequent list 104). In one example, the target size of the recent list 102 may be larger than a target size of the frequent list 104. In effect, the marker 106 conveys the actual sizes of the lists 102 and 104 in the cache 100. The actual sizes of the lists 102 and 104 may differ from the target sizes. The relative sizes of the recent list 102 and the frequent list 104 may change during operation of the cache 100.

As entries are added to and/or removed from the lists 102 and 104, their relative sizes may change. In other words, the marker 106 (or its virtual location) may move or change during operation of the cache 100. The marker 106 can reference a location or position relative to the entry list 112.

Entries in the recent list 102 are illustrated to the left of the marker 106. When an entry is added to the recent list 102, the entry is added at the top (e.g., next to the marker 106) and the remaining entries in the recent list 102 shift to the left (or away from the marker) as needed. Entries at the end or bottom of the recent list 102 may be evicted from the recent list 102 and from the cache 100.

Similarly, entries added to the frequent list 104 are added to the right of the marker 106 and the entries in the frequent list 104 shift to the right as needed. Eventually, entries in the recent list 104 may be evicted from the cache 100.

The recent list 102 operates much like an LRU (Least Recently Used) list. The recent list 102 includes for recent entries into the cache 100. Entries in the recent list 102 have been accessed a single time. The frequent list 104 is configured to store entries that have been accessed multiple times.

In one example each of the lists 102 and 104 is substantially operated as a least recently/frequently used list. As previously stated, however, the frequent list 104 accounts for frequency of access. In one example, the lists 102 and 104 (the entry list 112) are an example of a cache directory that identifies the data stored in the cache 100. The entry list 112 may, in another example, represent data. The entry list 112 may be used when adding/removing data from the cache 100.

Also, it is understood that the implementation of the entry list 112 may have no concept of direction but may be implemented using an appropriate data structure. Generally, the structure is configured such that the entries are arranged in a time-related and/or frequency manner. However, this structure or arrangement is not limiting, and other structures or list arrangements are within the scope of embodiments of the invention. The description of FIG. 1A aids in understanding the relationship between the cache size, entries in the cache, the manner in which entries are entered/evicted, and the manner in which the entries are identified in the cache 100 or in the directory or entry list 112.

Figure 1B:
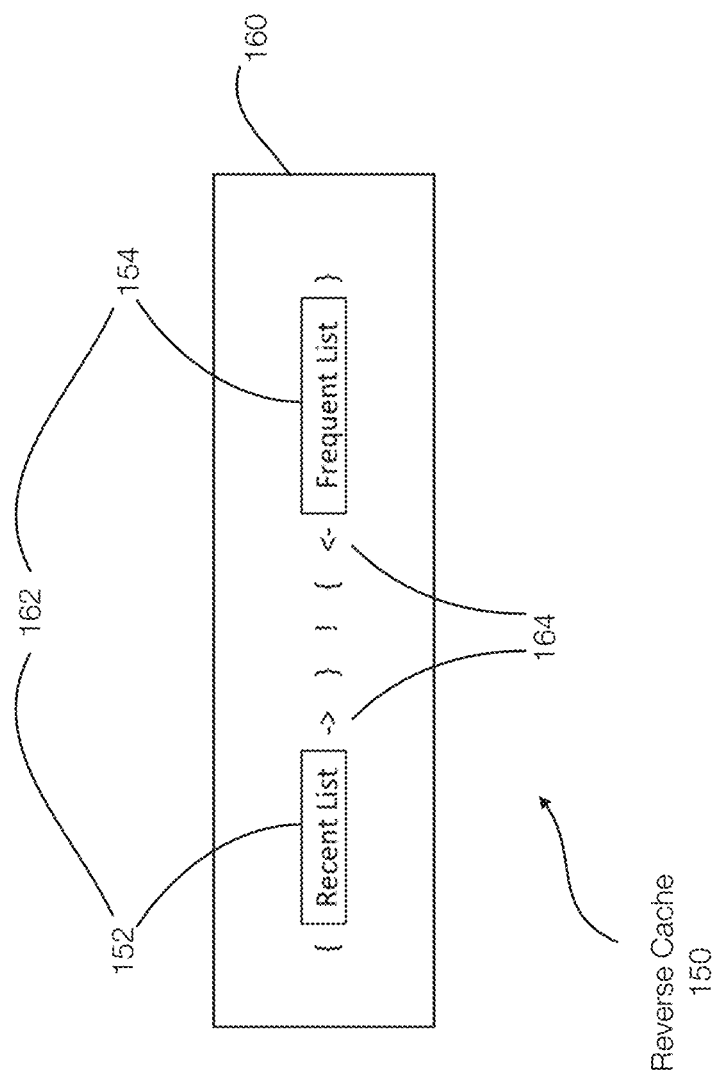
FIG. 1B discloses aspects of a reverse cache that may be used in conjunction with a main cache.

FIG. 1B illustrates an example of a reverse cache. In one example, the reverse cache 150 may be used in conjunction with a main cache to control how entries are added or promoted to a main cache. Thus, the cache 100 in FIG. 1A may be a main cache and the cache 150 may determine which entries are added to or inserted into the main cache 100.

FIG. 1B may also represent a reverse cache by reversing the directions of the arrows 114 (see FIG. 1A) to the direction illustrated by the arrows 164 as illustrated in the cache 150 shown in FIG. 1B. In one example, a reverse cache 150 uses the recency and frequency to identify data that can be inserted into the main cache. The reverse cache 150, in one example, is configured to identify data that should be added or promoted to a main cache. Because one example function of a reverse cache is to identify data to promote to the main cache, the reverse cache 150 may store data identifiers (e.g., fingerprints), index values, other entries or the like rather than the actual data. This allows the size of the reverse cache 150 to be small and efficient. The reverse cache 150 could be implemented within a main cache in one example.

Operation of the reverse cache 150 may promote an entry to a main cache. When an entry is promoted, the main cache stores the actual data rather than the fingerprint (or other representation) of the data. The reverse cache 150 includes a recent list 152, a frequent list 154, which constitute an example of an entry list 162. Thus, the entry list 162 includes the recent entries in the recent list 152 and the frequent entries in the frequent list 154.

In one example, the entry list 162 in reverse cache 150 stores a representation of data, a pointer to data, a unique data identifier, an index value or entry, or the like rather than storing actual data. Identifiers such as fingerprints (e.g., hashes of the data), index values or the like may be stored in the reverse cache.

For example, the recent list 152 and the frequent list 154 may store fingerprints of data. Storing fingerprints consumes less space than storing the corresponding data. Storing index values consumes less storage space than the fingerprints. When index values are used, the index may identify a specific fingerprint in a list of fingerprints or identify the corresponding data in another manner.

Figure 2:
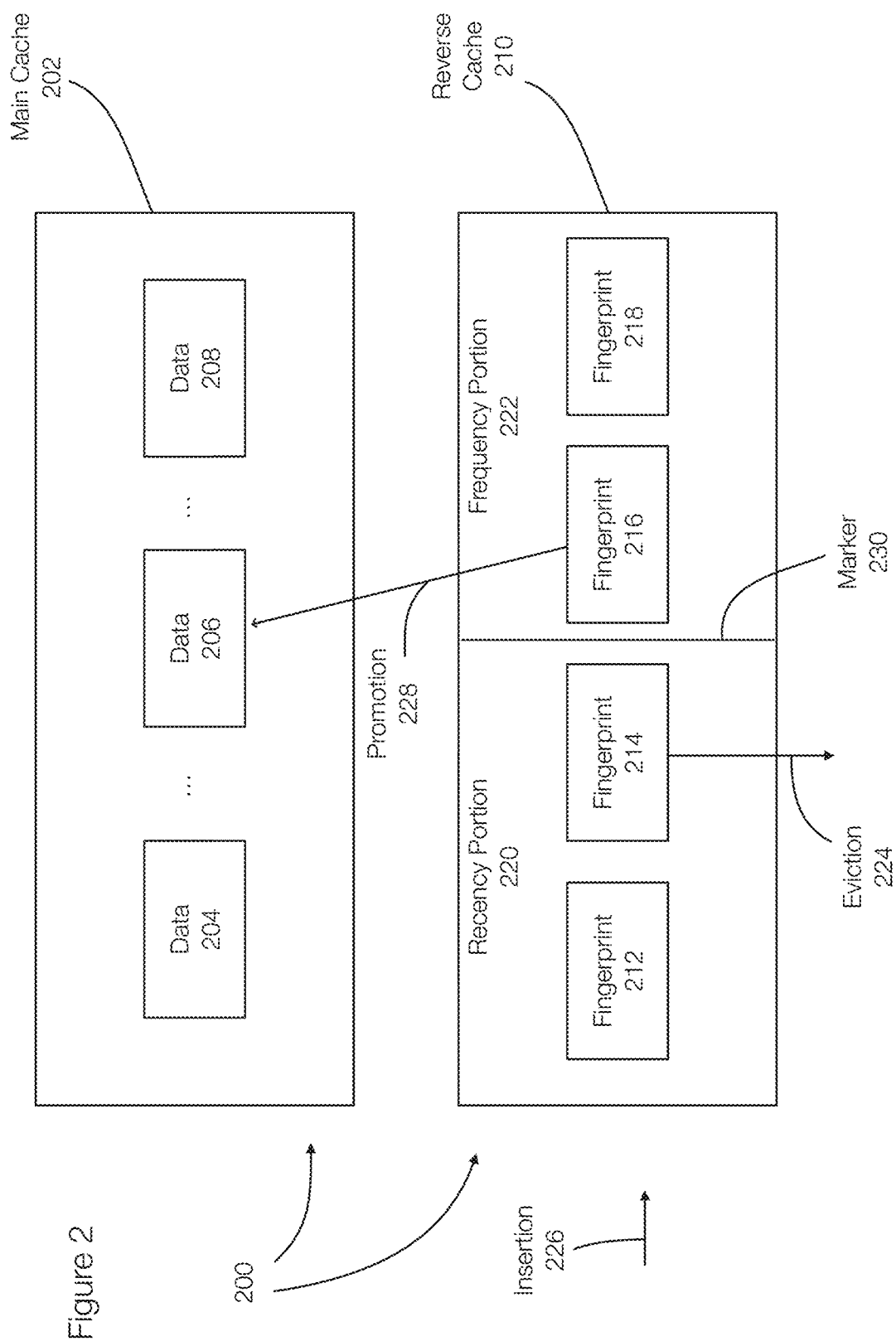
FIG. 2 discloses aspects of promoting entries from a reverse cache to a main cache and aspects of evicting entries from a reverse cache.

FIG. 2 discloses aspects of a reverse cache that is configured to identify data to promote to a main cache. More specifically, FIG. 2 illustrates a cache system 200 that includes a main cache 202 and a reverse cache 210. The main cache 202 may be an adaptive replacement cache (see FIG. 1A) in one example or may use other methods to manage/evict data from the main cache 202. FIG. 2 illustrates a reverse cache 210 that is configured to cooperate with a main cache 202 that stores or caches data that may be used, for example, by an application. In this example, the reverse cache 210 is configured to identify data that can be stored in or promoted to the main cache 202. When data is identified by the reverse cache, the data is promoted to the main cache 202. In one example, data is promoted to the main cache 202 in an automatic manner or by operation of the reverse cache 210.

Generally, the reverse cache 210 identifies data, for promotion to the main cache 202, that has been accessed multiple times. More specifically, operation of the reverse cache 210 tends to identify data that has been accessed multiple times and/or accessed recently. Data that has been accessed multiple times is a candidate for promotion to the main cache 202. In some examples, data must be accessed a threshold number of times prior to promotion to the main cache 202. In some examples, no threshold is required, and data is promoted by operation of the reverse cache 210 such that the data that has been accessed the most (compared to other entries in the reverse cache 210) or multiple times may be promoted to the main cache 202.

The main cache 202 and the reverse cache 210 may be implemented in the same memory such that the reverse cache 210 consumes a portion of memory along with the main cache 202. The reverse cache 210 and the main cache 202 may also be separate and may be managed separately. The main cache 202 and the reverse cache 210 are implemented in a memory that is typically faster (e.g., Random Access Memory (RAM)) than other memory such as a hard drive. The main cache 202 and/or the reverse cache 210 may be implemented as L1, L2, L3 memory or the like.

The main cache 202 stores data, represented by data 204, 206, and 208, and may be associated with recent entries and/or frequent entries such as illustrated in FIG. 1B. The data 204, 206, and 208 may be blocks, chunks, files, or the like. The reverse cache 210, in one example embodiment, does not store the actual data, although this is not excluded by embodiments of the invention. In this example, the reverse cache 210 includes a recency portion 220 (an example of a recent list) and a frequency portion 222 (an example of a frequent list) that store references to data, such as data fingerprints, which are represented by fingerprints 212, 214, 216, and 218. A fingerprint is an example of an identifier that may uniquely represent a block, chunk, file, or other data. A fingerprint may be a hash of the data. This allows the reverse cache 210 to be small compared to the main cache 202. The fingerprints or other identifiers stored in the reverse cache 210 may be referred to generally as entries in the reverse cache 210. Some metadata may also be stored, such as time of access, number of times accessed, or the like.

An example function of the reverse cache 210 is to identify data that may be promoted to the main cache 202 or to promote data to the main cache 202 based on the state of or operation of the reverse cache 210. The criteria may be to promote data once the data has been accessed a specified number of times. For example, the reverse cache 210 operates to determine that the fingerprint 216 satisfies the criteria (e.g., accessed "x" number of times) and the corresponding data may be promoted to the main cache 202 as the data 206. Alternatively, operation of the reverse cache 210 may promote the fingerprint 216 regardless of the criteria if used or without using criteria. In some examples, the criteria may be flexible and may depend on the state of the reverse cache 210. As previously stated, the number of times data should be accessed, which is an example of the criteria, prior to promotion may be fixed or flexible. Further, the use of criteria is not required.

For example, an entry may be promoted when the reverse cache 210 is full and a new entry (e.g., a new fingerprint) is inserted 226 into the reverse cache 210. Of course, the reverse cache 210 may elect to evict 224 an entry rather than promote an entry to the main cache 202. For example, if a particular entry most likely to be promoted to the main cache 202 has only been accessed a single time or less than a threshold number of times, the insertion 226 of a new entry may result in the eviction of the particular entry from the reverse cache 210 without the promotion of the particular entry.

When the fingerprint 216 satisfies the criteria or threshold for promotion, or by operation of the reverse cache 210 which, in effect, implements the criteria or implements flexible criteria, the data corresponding to the fingerprint 206 is promoted to the main cache 202 as the data 206. Promoting the fingerprint 216 may also evict the fingerprint 216 from the reverse cache 210. In another example, a fingerprint, such as the fingerprint 214, may reach a point where the fingerprint 214 is evicted 224 from the reverse cache. In this example, the fingerprint 214 has only been accessed once and is at the end of the recency portion 220. This indicates that the fingerprint 214 is the oldest entry (at least with respect to recency) and is the least recently accessed. Thus, the insertion 226 of a new fingerprint or index value may result in the eviction 224 of the fingerprint 214.

This may depend on the state of the reverse cache 210 or other factors. For example, if the reverse cache 210 is full, adding a new entry results in the promotion of an entry or the eviction of an entry. In one example, the reverse cache 210 may operate to automatically promote an entry. Alternatively, the reverse cache 210 may implement a criterion or criteria. If the criterion or criteria are not satisfied, an entry is evicted to accommodate the new entry rather than promoting an entry to the main cache 202.

In the reverse cache 210 entries are generally evicted from the recency portion 220 of the reverse cache 210 and promoted to the main cache 202 from the frequency portion 222. Entries in the recency portion 220 that are accessed a second time are moved to the frequency portion 222. Promotions and evictions, however, are not limited thereto.

The recency portion 220 typically includes entries that have been accessed a single time. When an entry is inserted 226 into the reverse cache 210, the entry is inserted from the left into and the recency portion 220 as a fingerprint (or other identifier) and entries present in the recency portion 220 are pushed to the right. At a certain point (e.g., reaching the marker 230), entries in the recency portion 220 are evicted 224.

When an entry is added to the reverse cache 210 and more specifically to the recency portion 220, the entry may be added as a fingerprint or an index (or other pointer or data representation). One goal is to consume less data than required by the data itself. If the entry is inserted as an index value, by way of example, the index i for entry F; in the fingerprint index F may be stored as the index value 242.

If an entry in the recency portion 220 (now stored as a fingerprint) is accessed a second time, the entry is moved to the frequency portion 222. In this visual example, moving an entry from the recency portion 220 adds the entry to the right side of the frequency portion 222 and entries present in the recency portion 220 may be shifted to the left. This may also involve promoting an entry from the frequency portion 222 to the main cache 220. In another example, the position of the marker 230 may change when moving an entry from the recency portion 220 to the frequency portion 222.

More specifically, once an entry is in the frequency portion 222 of the reverse cache 210, the entry moves to the left and, at some point may be promoted 228 to the main cache 202, for example after reaching the marker 230. If an entry in the frequency portion 222 has not been accessed for a threshold amount of time, the entry may be evicted from the frequency portion 222.

Generally, however, new entries to the reverse cache 210 are inserted into the recency portion 220 and make their way to the right where they are eventually evicted 224 unless moved to the frequency portion 222 of the reverse cache 210, where they enter from the right into the frequency portion 222 in this visual example.

In one embodiment, the reverse cache is a gating mechanism for adding or inserting data into a main cache. In one example, the reverse cache is configured such that only entries that are accessed more than once are promoted or entered into the main cache. An entry in the reverse cache for data that is accessed only once remains in the recency side and will eventually be evicted from the reverse cache as entries for more recently accessed data are added to the reverse cache. At the same time, entries accessed more than once are on a path to be promoted to the main cache.

Figure 3:
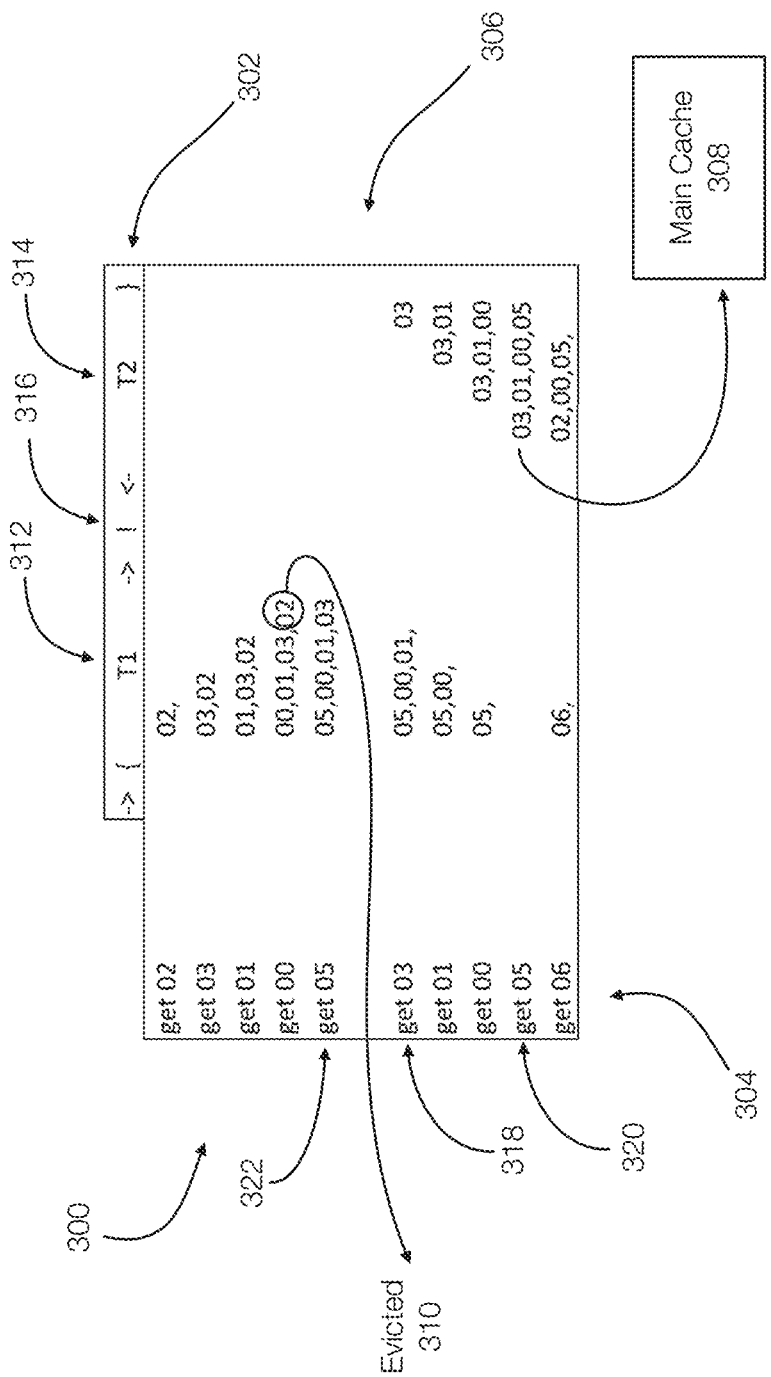
FIG. 3 discloses aspects of operating a reverse cache that includes a recent list and a frequent list.

FIG. 3 illustrates an example a cache system. The cache system 300 includes a reverse cache 302 and a main cache 308 and further illustrates an eviction operation and an insertion operation.

The reverse cache 302 includes a recent list 312 (T1) and a frequent list 314 (T2). The commands 304 represent data accesses and result in an operation in the reverse cache 302.

In this example, the reverse cache 302 accommodates 4 entries in total. The reverse cache 302 is sized to hold four entries.

Initially, the commands get 02, get 03, get 01, and get 00 are performed. This results in entries 00, 01, 03, 02 in contents 306 of the recent list 312. Because the entry 02 is the oldest, the entry 02 is the likely candidate for eviction. After four gets, the cache 302 is full.

When get 05 is performed (at line 322), the 02 entry is evicted 310. In this example and prior to eviction of the entry 02, the entries 00, 01, 02, 03, and 05 have all been accessed a single time. Because the entry 02 is the oldest and has only been accessed once, the entry 02 is evicted, and the entries 05, 00, 01, and 03 are present in the reverse cache 302. This order also represents the relative amount of time these entries have been in the recent list 312. This further illustrates that the oldest entry ((03) after inserting 05 and evicting (02)) is near the marker 316. At this point, the entry 05 is the most recently accessed entry in the reverse cache 302.

The next set of commands, starting with the command in line 318 illustrate the promotion of the entry 03 to the main cache 308. The get 03 command moves the entry 03 to the frequent list 314 because this is the second access of the entry 03, which is currently in the recent list 312. Performing the commands get 01, get 00, and get 05, after performing the command get 03, result in a situation where all of the entries in the recent list 312 have been moved to the frequent list 314.

The next command get 06 is then executed. Because the cache 302 is full (the cache 302 includes four entries, which is the size of the cache 302), inserting the entry 06 into the recent list 312 also causes the entry 03 to be promoted to the main cache 308. It is understood that promoting the entry 03 to the main cache 308 also evicts the entry 03 from the reverse cache 302.

In effect, entries into the reverse cache 302 effectively enter a criteria evaluation. Entries into the recent list 312 are pushed towards the "!" 316 and may be evicted. Entries in the frequent list 314 are also pushed towards the "!" and may be promoted to the main cache 308. The reverse cache 302 allows data promoted to the main cache 308 to be selected based on the criteria of or the operation of the reverse cache 302. For example, only data that has been accessed more than once is eligible for entry to the main cache 308—only entries from the frequent list 314 are eligible for promotion. The criteria for entry to the main cache 308 can vary and is generally a combination of number of times accesses and when the entry was last accessed.

In the example shown in FIG. 3, the entries –3, 01, 00, and 05 (at line 320) have all been accessed more than once and are present in the frequent list 314. However, the entry 03 is promoted to the main cache 308 even though the entry 05 was accessed more recently.

The manner in which entries in the frequent list 314 are ordered can be changed. The entries may be ordered based on number of times accessed and/or time of most recent access. However, altering the order when adding an entry to the frequent list 314 may consume additional resources.

For example, the entries in the frequent list 314 may be ordered or reordered at different times. When an entry is added to the frequent list 314 (or based on another event or trigger), the entries may be ordered from most recently accessed and number of times accessed. Consider the following entries:

00—accessed thrice and most recently at time t1
01—accessed thrice and most recently at t2 (more recent than t1)
02—accessed twice and most recently at time t3 (between times t1 and t2)
03—accessed twice and most recently at time t4 (more recent than time t3).

Under these conditions (and assuming that the current order in the frequent list is different), these entries may be reordered as follows: 01, 00, 03, 02. Thus, the entry 01 is next in line to be promoted. In other words, the frequent list 314 may be configured to reorder the entries rather than insert from the right side and promote from the left side. Reordering the entries may allow the reverse cache 302 to identify better candidates for promotion. In one example, the entries are reordered in tiers. Entries are grouped into tiers based on number of times accessed. This ensures that entries that have been accessed three times are more likely to be promoted than entries that have been accessed twice. Within each tier, entries may be ordered based on time of most recent access. This allows the operation of selecting an entry for promotion to consider, in addition to the number of times the entry has been accessed, the time of most recent access.

In another example, entries in the frequent list are only reordered when an entry is accessed another time. Consider the following entries in line 320. Assume, in this case, each of the entries 03, 01, 00, and 05 have been accessed twice and this results in the order shown in FIG. 3. If the entry 00 is accessed a third time, the entry 00 may be moved to the top such that the order become 00, 03, 01, 05. This illustrates that entries may be ordered or reordered based on number of times accessed. The reordering may also consider the time of most recent access.

Figure 4A:
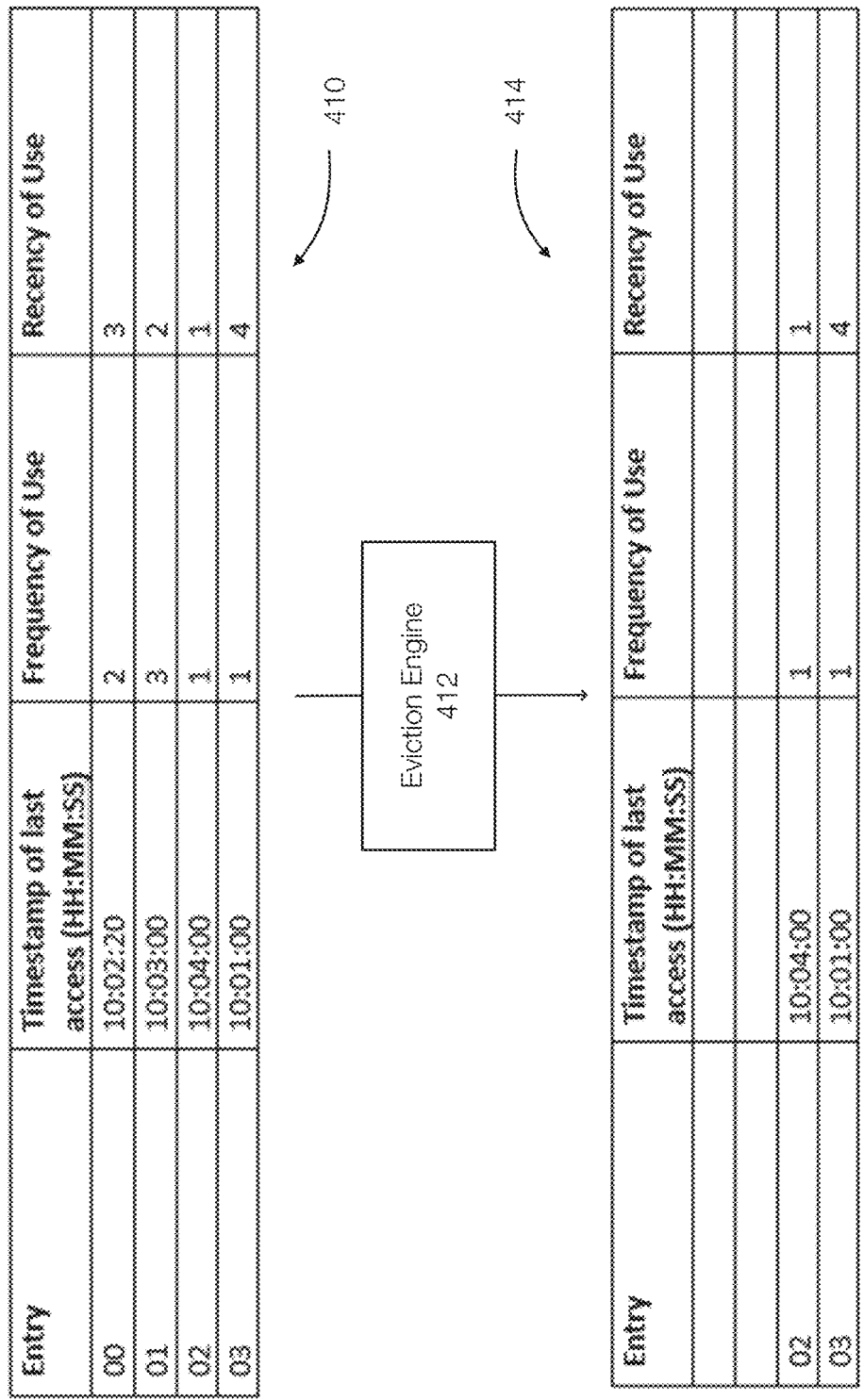
FIG. 4A discloses aspects of adjusting timestamps in a cache.

FIG. 4A discloses aspects of a time threshold-based cache management. In one example, a main cache is implemented as an ARC cache and embodiments of the invention are directed towards evicting data from the main cache using frequency, recency, and/or time-based adjustments. In this example, a table 410 illustrates a cache that stores four entries: 00, 01, 02 and 03. The table 410 illustrates, for each entry, a timestamp of last access, a frequency of use, and a recency of use. Entries whose frequency of use is greater than 1 are in the T2 or frequent list while entries whose frequency of use is equal to 1 are in the T1 or recent list.

When evicting entries based on time (e.g., earlier than a certain time), it is possible for entries that are more recently/frequently used to be evicted due to their access timestamp compared to the eviction criteria. If the eviction process is limited to evicting N entries, items that are less recently/frequently used may stay in the cache because the eviction process never processed those entries (i.e., N entries have already been evicted prior to reaching those entries).

The table 410 in FIG. 4A illustrates the status of cache entries at a point in time when an eviction engine 412 executes an eviction process to evict stale entries from the cache. The eviction process is configured to evict two entries using a threshold time of 10:03:01 in this example. Using this threshold, there are three entries that are candidates for eviction (00, 01, 03) because each has a timestamp of last access that is less than (or earlier than) the threshold time. However, the eviction process is configured to evict a maximum of two entries. If the cache entries are processed linearly and the number of evictions is limited to 2, the entries 00 and 01 will be evicted from the cache.

As illustrated in the table 414, the result is not optimal. The table 414 illustrates the cache after running the eviction process. As illustrated, only the entries 02 and 03 remain in the cache. This may not be an optimal result.

For example, an evaluation of the recency and frequency of the entries remaining in the cache demonstrates that the timestamp of the entry 03 was earlier than or occurred before the timestamps of the entries 00 and 01. The remaining entries 02 and 03 were less frequently used than the evicted entries 00 and 01. The remaining entry 03 has a less recency of use compared to evicted entries 00 and 01. This demonstrates that the eviction thread evicted entries from the cache when there were better candidates for eviction. More specifically, this suggests that the entry 03 should have been evicted before the entries 00 and 01

Figure 4B:
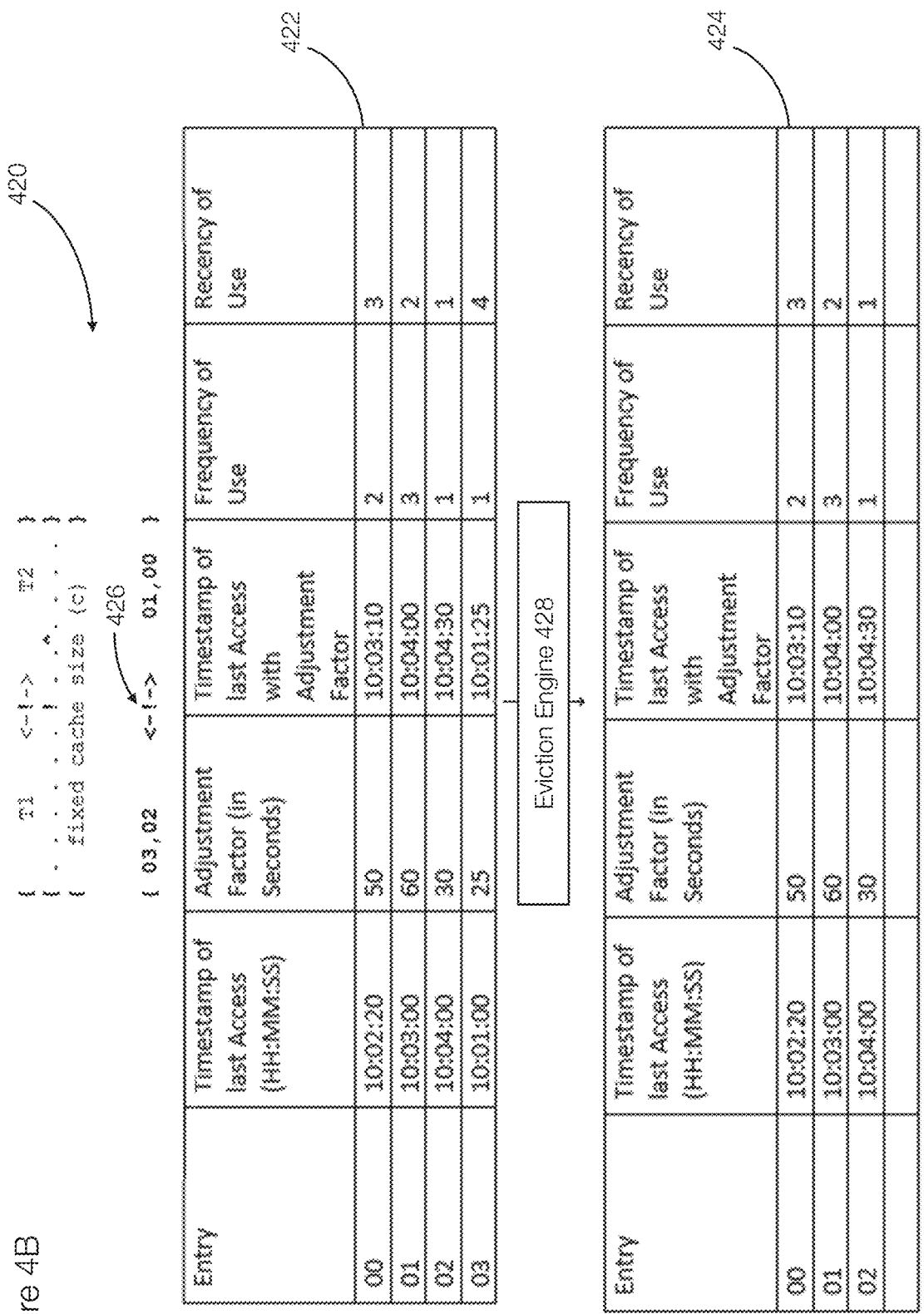
FIG. 4B discloses additional aspects of adjusting timestamps in a cache.

FIG. 4B discloses aspects of an eviction operation using an adjustment factor. The adjustment factor is configured to improve the efficiency of the cache eviction operations and to ensure that more optimal candidates are identified and evicted by the eviction engine. The adjustment factor is used to adjust at least one characteristic or metadata of the cache entries.

FIG. 4B illustrates a cache 420 that includes four entries: 00, 01, 02, and 03. Entries 02 and 03 are in the T1 list or recent list while the entries 00 and 01 are in the T2 or frequent list. When the eviction engine executes on the table 422, which is representative of the cache entries, the entries are provided with an adjustment factor. The adjustment factor is applied to the timestamp of last access to generate a timestamp of last access with adjustment factor. Thus, the adjustment factor is used to generate adjusted timestamps.

The adjustment factor can be implemented in many different ways and configurations. By way of example only and not limitation, the adjustment factors for entries in the T1 list may be determined as follows. The top entry (which is 02 in T1 list of the cache 420) is given an adjustment factor of 30 seconds. The next entry in the T1 list (03) in this example, is given an adjustment factor of 25 seconds. In this example, the adjustment factor decreases for entries further from the top of the list or further from the marker 426. As a general rule by way of example only, entries in the T1 or recent list nearer to the top are adjusted using an adjustment factor that is larger than entries further from the top of the list. The manner in which the adjustment factor decreases can vary. In this example, the adjustment factor decreases by 5 seconds for each entry.

The adjustment factor for entries in the T2 or frequent list may be the same or different. In this example, the adjustment factor for the entries in the T2 list are double the adjustment factor for the entries in the T1 list. Thus, the entry 01 (at the top of the T2 list) has an adjustment factor of 60 seconds and the entry 02 has an adjustment factor of 50 seconds. The adjustment factors applied to entries in the T2 list may decrease by a factor, a constant, or the like as the entry index increases (the index of the entry at the top of the list is 0 and the index for the nth entry is n).

When the eviction engine 428 processes the entries in the cache 420 represented in the table 422 whose characteristics or metadata have been adjusted with an adjustment factor, the eviction engine 428 identifies a single candidate for eviction-entry 03. This is true, in this example, even if the eviction engine 428 is configured to identify a maximum of two entries for eviction. Thus, as illustrated in the table 424, the entry 03 is evicted from the cache 420.

More specifically in this example, assuming that the threshold time was 10:03:01, all of the entries except the entry 03 had an adjusted timestamp that was greater than or later than the threshold time. Further, the entry 03 has the lowest frequency of use. Further, the entry 03 has a lower recency than the other entries in the cache 420 and the frequency of use for the entry 03 was equal to that of the entry 02. Thus, the eviction engine 420, compared to FIG. 4A, evicted an entry that was a better candidate for eviction than the entries 00 and 01, which were evicted by the eviction engine 412 that did not use an adjustment factor. The frequency of use is not affected by the adjustment factor in one embodiment.

Embodiments of the invention, thus provide novel cache eviction strategies and are capable of evicting multiple entries at the same time. Entries that are frequently or recently used are not evicted because the adjustment factor prevents these entries from being identified as candidates for eviction based on the time threshold.

Figure 4C:
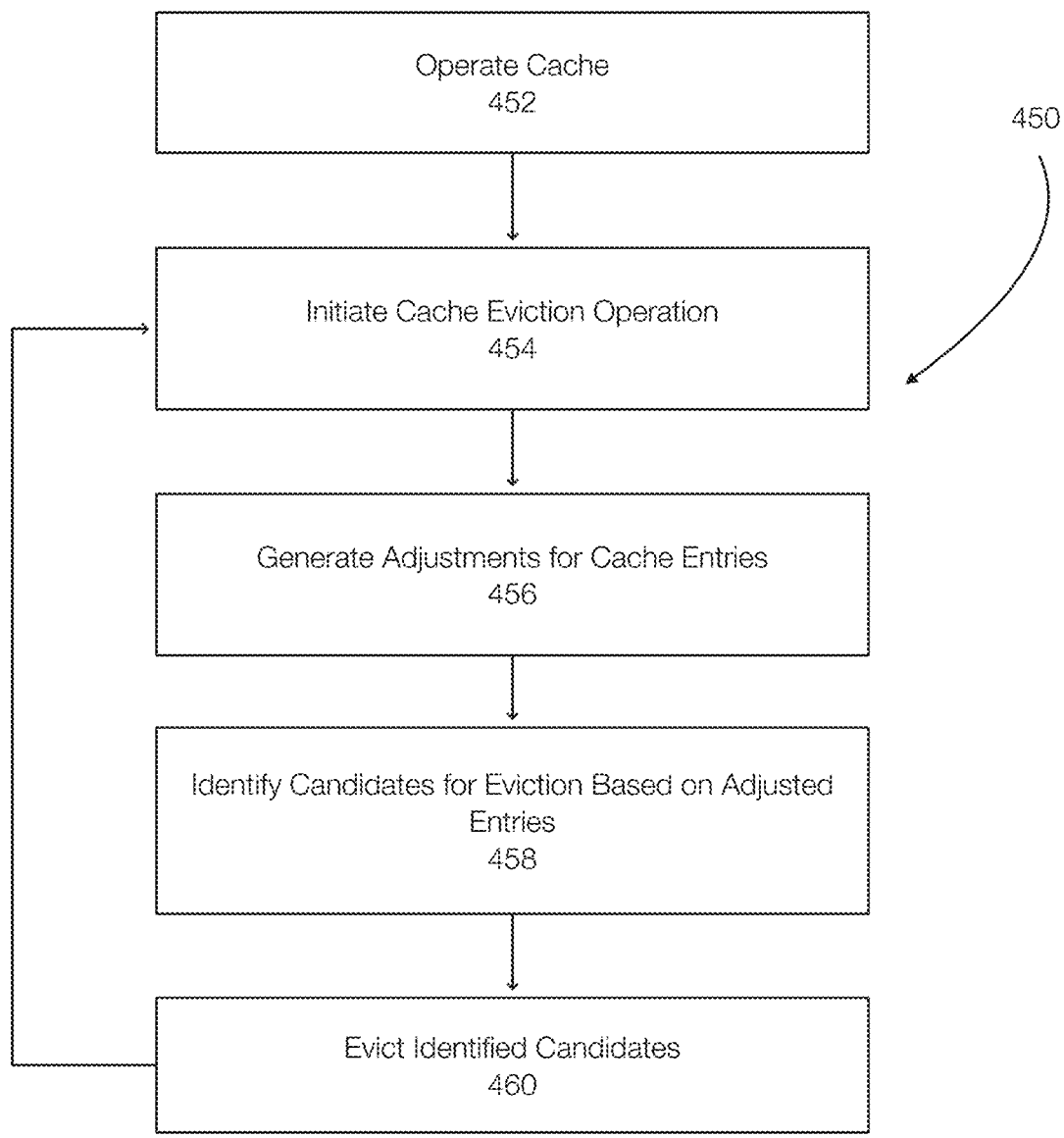
FIG. 4C discloses aspects of evicting entries from a cache.

FIG. 4C discloses aspects of a method for performing an eviction operation. In one example, the cache may implement an eviction strategy based on one or more aspects or characteristics of the entries in the cache including, but not limited to, recency, frequency, and time (i.e., a timestamp). In one example, the eviction operation may adjust at least some of the characteristics or metadata of the entries prior to identifying candidates for eviction. Some of the elements may be performed on an ongoing basis, periodically, or less frequently than other elements of the method 400.

In this example method 450, the cache operates 452 normally and includes an entry list or cache directory or data. The cache entry list may include a recent list and a frequent list. Normal operation may include adding new entries to the cache or accessing existing entries in the cache. When these actions occur, the entry list is adjusted as previously described.

Next, a cache eviction operation may be initiated 454 or triggered. In one example, the cache eviction operation includes aspects of a time threshold-based eviction operation. Thus, a threshold time may be established or determined. The time threshold may be determined by default, by user input, or the like.

Once the eviction operation is initiated, adjustments for the cache entries may be generated 456. The adjustments to the cache entries can all be determined by the eviction process. Alternatively, adjustments may be determined or recalculated as entries are newly added or rearranged. Thus, the adjustment values may already be generated when an eviction operation is generated. The adjustments may need to be refreshed in some examples. Generating 456 the adjustments can include generating an adjusted timestamp (i.e., adjusted timestamp since last access) by adjusting or altering the timestamp since last access by the adjustment factor.

Once the adjustments or adjusted timestamps are generated, candidates for eviction are identified 458 based on the adjusted entries. Because the eviction operation identifies candidates based on a time threshold, the candidates are identified by comparing the time threshold to the adjusted timestamps of the cache entries.

In one example, the eviction operation may identify all candidates for eviction. In this case, the candidates are identified 458 and the earliest entries are evicted 460. This number may be limited by a maximum. In another example, the eviction operation identifies 458 candidates until the maximum number of candidates have been found. In either case or in other embodiments, the identified entries (up to the maximum) are then evicted 460. In one example, it is not necessary to evict the maximum number of entries from the cache. Further, evictions may not be performed if the cache has storage. In one example, the amount of storage available may influence the decision of whether to evict one or more entries.

In these examples, embodiments of the invention allow the time threshold-based cache eviction operation to account for recency and/or frequency of the cache entries rather than simply relying on identified candidates based on the time threshold alone.

In one example, the adjustment factor may vary. For example, as an entry in the recent or T1 list moves to the bottom of the recent list, the adjustment factor may change by a constant. The recent list adjustment factor calculation from i=0 to i=n, where the top entry in the T1 list is an index i=0 is as follows:

$$\text{adjustment factor}_{i+1} = \text{adjustment factor}_i - \text{constant}.$$

Similarly, the adjustment factor for entries in the frequent list may be expressed (in terms of the constant for the recent list by way of example only) as follows:

$$\text{adjustment factor}_{i+1} = \text{adjustment factor}_i - 2 * \text{constant}.$$

These examples illustrate that the adjustment factors for the entries in the T1 and T2 lists can be related, but this is not required. Further, the constant can be replaced with a variable constant such that each step reduces the adjustment factor or value by a greater amount than the previous reduction.

Thus, as an entry moves to the left in the T1 list, the adjustment factor decreases by 5 seconds for each move.

Figure 5:
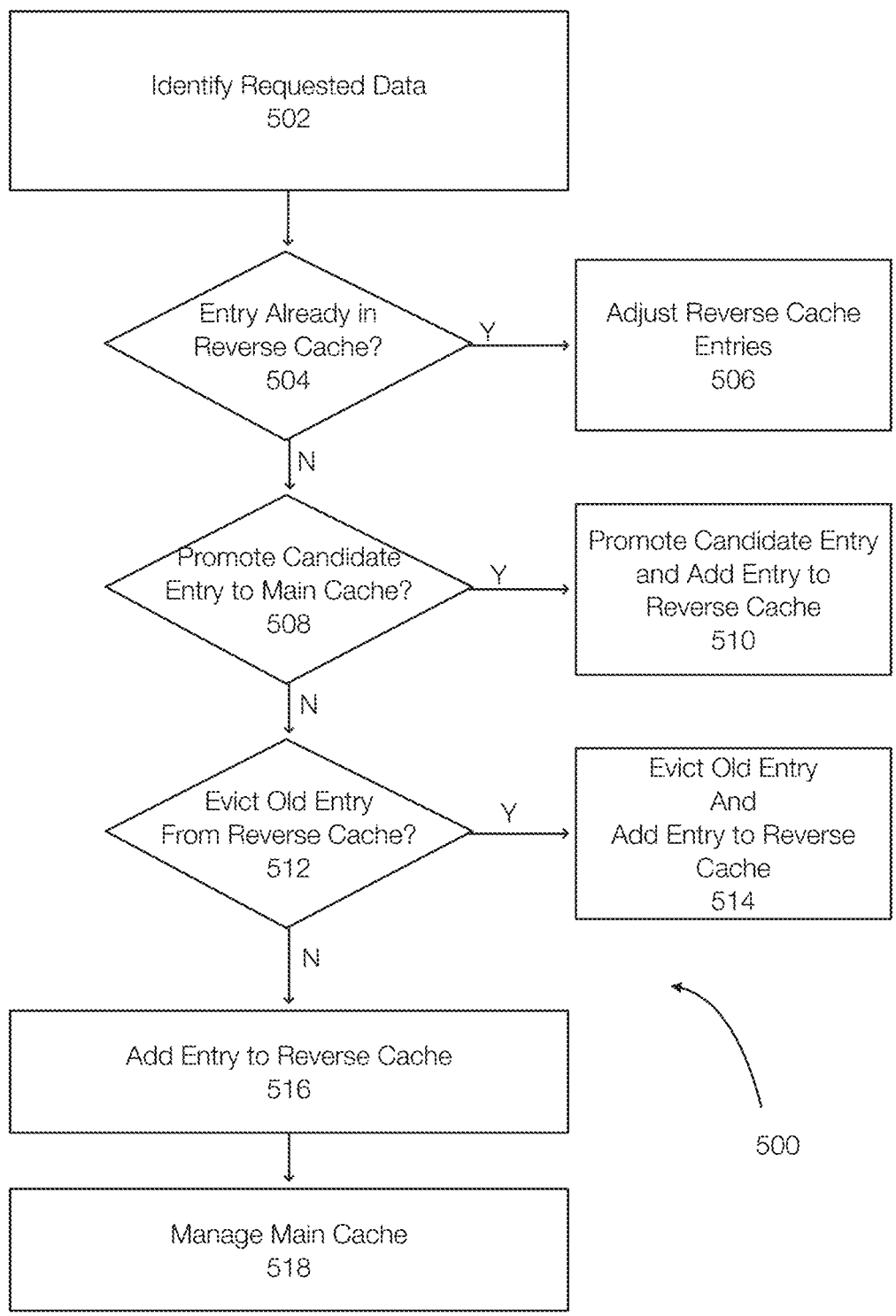
FIG. 5 discloses aspects of operating a cache system that includes a main cache and a reverse cache.

FIG. 5 discloses aspects of inserting data into a cache using a gateway mechanism such as a reverse cache. In this example, data that has been requested is identified 502. An application, for example, may access data. In one example, the method 500 is performed after a determination is made that the requested data is not present in the main cache.

A determination is made as to whether the requested data (or fingerprint or index value thereof) is present 504 in the reverse cache. If the entry (e.g., the fingerprint or index value of the requested data) is present in the reverse cache (Y at 504), the entries in the cache are adjusted. For example, if the entry is in the recent side (e.g., recent list), the entry is moved to the frequent list. If the entry is in the frequency list, the entry may be moved within the frequency list based on number of times accessed and/or time of access. The frequent list may be ordered based on number of times accessed and/or based on recency of access. Thus, moving an entry on the frequency side may or may not move the entry to the top of the list.

For example, assume that a first entry in the frequency list has been accessed 5 times and the next three entries in the frequency list have been accessed 3 times. If an entry that has been accessed 2 times is accessed a third time, the entry is moved to the second position ahead of the other entries that have been accessed three times (because of recency), but behind the entry that has been accessed 5 times. In another example, the entry is simply moved to the top of the frequency list regardless of how many times other entries have been accessed. This allows the reverse cache, when operating to promote an entry to the main cache, to account for both frequency and recency.

If the entry is not in the reverse cache (N at 904), a determination is made regarding whether there are candidates to promote 508 to the main cache. If there is a candidate (Y at 508), the candidate is promoted to the main cache and the current entry is added to the recency list of the reverse cache.

If there is no candidate to promote (N at 508), a determination is made regarding whether to evict 512 an old entry from the reverse cache. If there is an entry to evict (e.g., oldest entry in the recent list), the old entry is evicted from the reverse cache and the entry is added to the recent list of the reverse cache.

If there is no candidate to evict, the entry is added 516 to the recent list of the reverse cache. In a case where the cache is full, it may be necessary to evict an entry or promote an entry in order to accommodate the new entry.

When promoting or evicting entries from the reverse cache, the promotion or eviction may occur in various circumstances. In one example, the decision occurs when the reverse cache is full and a new entry for the cache is received. Thus, in order to add the new entry to the reverse cache, it is necessary to make room for the new entry by evicting or promoting another entry.

Alternatively, the new entry can simply be added if there is room in the cache. However, entries can still be promoted even when the cache is not full based, by way of example, on an access threshold. When an entry is accessed a certain number of times (the threshold), the entry may be promoted regardless of whether the reverse cache is full or not.

Next, the main cache is managed 518. More specifically, entries or data in the main cache are managed based on the recent list, the frequent list, and/or the adjusted time thresholds. Embodiments of the invention, in addition to operating a reverse cache that determines which entries are promoted to the main cache, also manages the main cache to ensure that entries are evicted as discussed herein.

Figure 6:
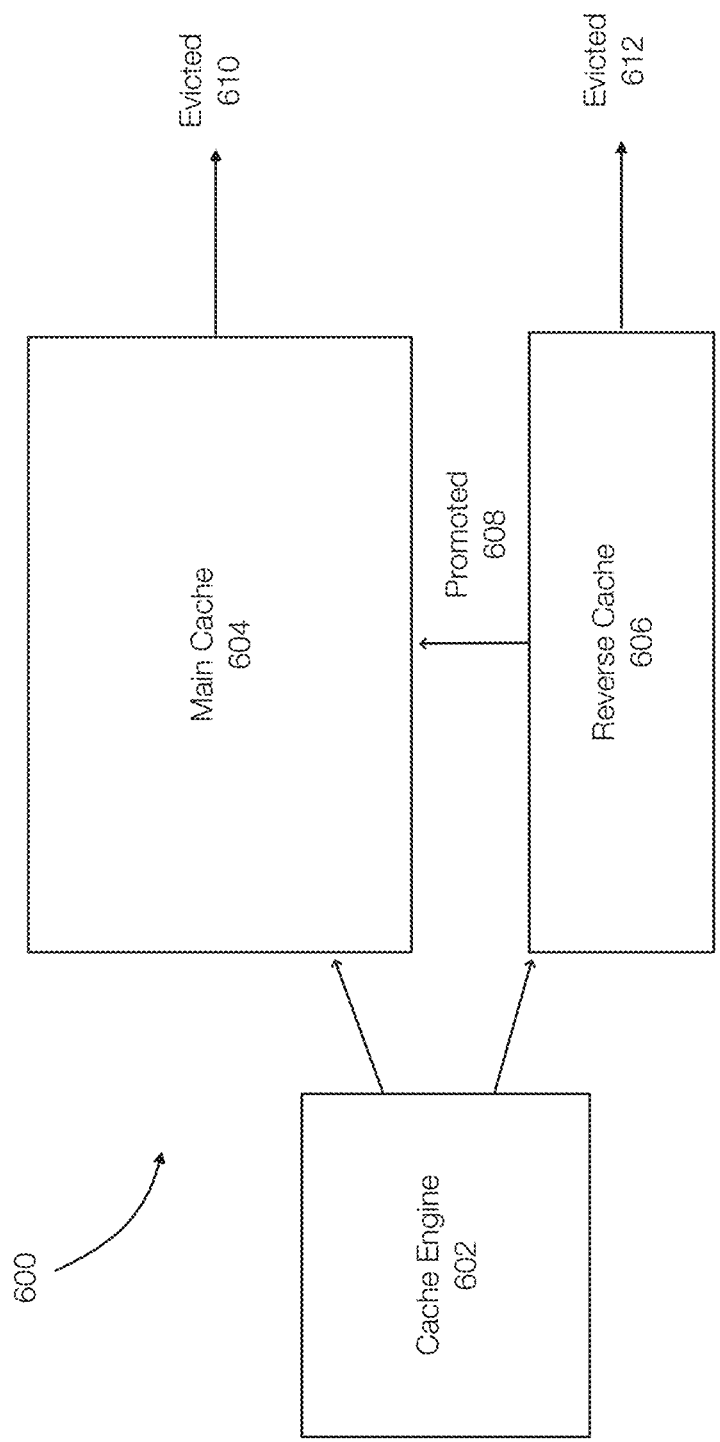
FIG. 6 discloses aspects of a cache system.

FIG. 6 discloses aspects of a cache system. The cache system 600 includes a main cache 604, a reverse cache 606, and a cache engine 602. The cache engine 602 may be a cache controller configured to operate the main cache 604 and the reverse cache 606.

In this example, the reverse cache 606 is operated to identify entries or data to promote 6008 to the main cache 604. Thus, the cache engine 602 may operate the reverse cache 606 and identify entries to promote 608 and/or evict 612 from the reverse cache 606.

The main cache 604 may be an ARC cache that operates to evict entries based on recency, frequency, and/or adjusted time values. The main cache 604 and the reverse cache 606 may have similar structures (recent list T1 and frequent list T2) that are operated in different manners. As discussed herein, the reverse cache 606 is operated to identify entries to promote and the main cache 604 is operated to evict stale entries. Aspects of the differences in operation between the main cache 604 and the reverse cache 606 is discussed with respect to FIGS. 1A and 1B.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, cache operations including cache eviction operations, least frequently used operations, frequency and/or recency-based operations, time threshold-based operations, or combination thereof. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any data backup platforms or data storage environments.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. Cache operations may be implemented therein.

In addition to the cloud environment, the operating environment may also include one or more clients that are capable of collecting, modifying, and creating, data. These clients may use caches during these operations. As such, a particular client may employ, or otherwise be associated with, one or more instances of each of one or more applications that perform such operations with respect to data including cache related operations. Such clients may comprise physical machines, or virtual machines (VM) or containers.

Particularly, devices in the operating environment may take the form of software, physical machines, or VMs, or containers, or any combination of these, though no particular device implementation or configuration is required for any embodiment. Similarly, data protection system components such as databases, storage servers, As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1 method, comprising: operating a reverse cache that is configured to identify data to insert into a main cache, wherein operating the reverse cache includes: determining whether an entry for a requested data is present in a reverse cache, adding the entry for the requested data to the reverse cache when the entry is not present in the reverse cache, wherein the entry is adjusted in the reverse cache when the entry is present in the reverse cache, and promoting a candidate entry from the reverse cache to the main cache.

Embodiment 2

The method of embodiment 1, wherein the reverse cache comprises a frequent list and a frequency list, further comprising, when the entry is present in the reverse cache, moving the entry to the frequent list when the entry is in the recent list.

Embodiment 3

The method of embodiment 1 and/or 2, wherein the candidate entry promoted to the main cache is in the frequent list.

Embodiment 4

The method of embodiment 1, 2, and/or 3, further comprising evicting an entry from the recent list of the reverse cache after a period of time and when the entry is not accessed a second time.

Embodiment 5

The method of embodiment 1, 2, 3, and/or 4, further comprising moving the entry to from the recent list to the frequent list when the entry is in the recent list and is accessed a second time.

Embodiment 6

The method of embodiment 1, 2, 3, 4, and/or 5, further comprising promoting the entry to the main cache after the entry is moved to the frequent list and becomes the candidate entry for promotion to the main cache.

Embodiment 7

The method of embodiment 1, 2, 3, 4, 5, and/or 6, further comprising evicting entries from the main cache based on metadata associated with each entry in the main cache, wherein the metadata includes a recency value, a frequency value, a timestamp, and an adjusted timestamp, wherein evicting entries from the main cache further comprises adjusting timestamps of each of the entries to generate adjusted timestamps for each of the entries.

Embodiment 8

The method of embodiment 1, 2, 3, 4, 5, 6, and/or 7, wherein the main cache and the reverse cache each comprise lists, the lists including a recent list and a frequency list, wherein the lists of the reverse cache are operated differently from the lists of the main cache.

Embodiment 9

The method of embodiment 1, 2, 3, 4, 5, 6, 7, and/or 8, wherein entries in the recent list are moved to the frequent list when accessed a second time for each of the reverse cache and the main cache.

Embodiment 10

The method of embodiment 1, 2, 3, 4, 5, 6, 7, 8, and/or 9, wherein the entry is the candidate entry.

Embodiment 11

A method for performing any of the operations, methods, or processes, or any portion of any of these, or any combination thereof disclosed herein.

Embodiment 12

A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
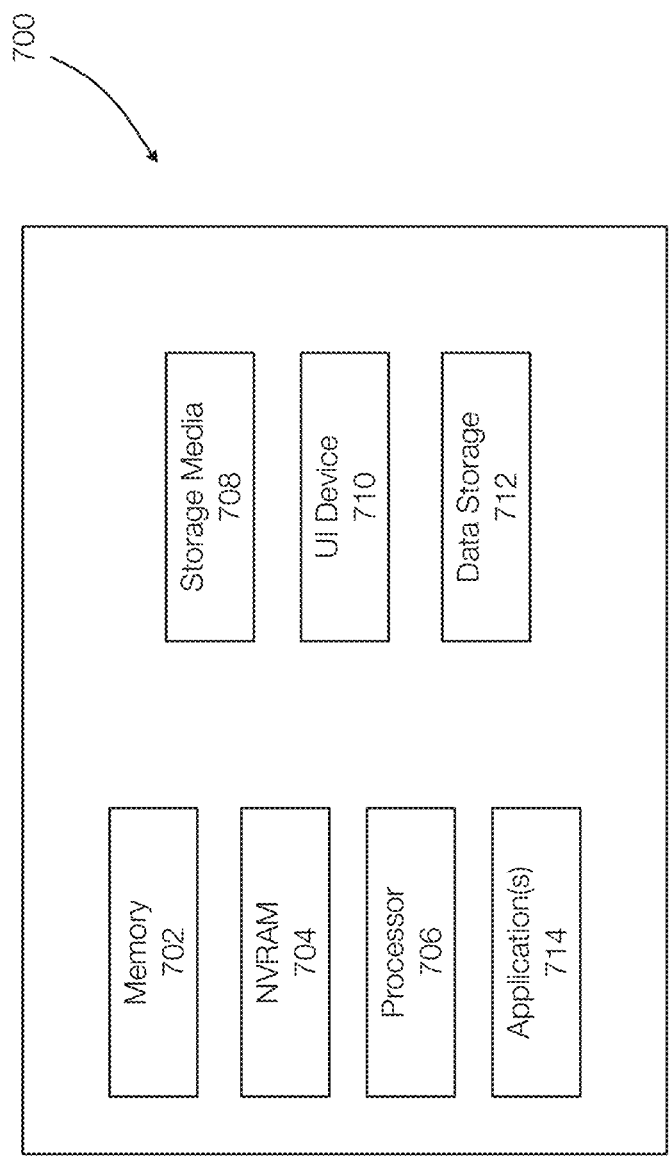
FIG. 7 discloses aspects of a computing device or a computing system.

With reference briefly now to FIG. 7, any one or more of the entities disclosed, or implied, by the Figures, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random-access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein. One or more of the memory components 702 may include one or more caches. The caches may include multiple levels of caches.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   operating a reverse cache that is configured to identify data to insert into a main cache, wherein the reverse cache is configured to store entries representing the data and wherein the main cache stores data, wherein operating the reverse cache includes:
      determining whether an entry for a requested data is present in the reverse cache;
      adding the entry for the requested data to the reverse cache when the entry is not present in the reverse cache, wherein the entry is adjusted in the reverse cache when the entry is present in the reverse cache; and
      promoting a candidate entry from the reverse cache to the main cache; and
   adjusting metadata for entries in the main cache to account for recency values and frequency values associated with the entries in the main cache, wherein the adjusted metadata includes adjusted timestamps, wherein timestamps for entries that have been accessed more frequently and/or more recently that other entries are adjusted differently than timestamps for entries that have been accessed less frequently and/or less recently; and
   evicting entries from the main cache based on the adjusted metadata.

2. The method of claim 1, wherein the metadata comprises timestamps and wherein the entries comprise an index value or a fingerprint.

3. The method of claim 2, wherein adjusting the metadata includes adjusting at least some of the timestamps using an adjusting factor to generate adjusted timestamps.

4. The method of claim 3, further comprising identifying eviction candidate entries based on the adjusted timestamps.

5. The method of claim 4, wherein the adjusting factor is configured such that entries less likely to be accessed are evicted from the main cache.

6. The method of claim 2, wherein the metadata includes a recency value, a frequency value, a timestamp, and an adjusted timestamp, wherein evicting entries from the main cache further comprises adjusting timestamps of each of the entries to generate adjusted timestamps for each of the entries.

7. The method of claim 6, further comprising promoting the candidate entry when the reverse cache is full and a new entry is added to the reverse cache.

8. The method of claim 6, further comprising promoting the candidate entry when the candidate entry has been accessed a threshold number of times.

9. The method of claim 2, wherein the main cache and the reverse cache each comprise lists, the lists including a recent list and a frequency list, wherein the lists of the reverse cache are operated differently from the lists of the main cache.

10. The method of claim 1, further comprising identifying the candidate entry based on frequency of access and/or recency of access.

11. The method of claim 1, wherein the reverse cache comprises a frequent list and a frequency list, further comprising, when the entry is present in the reverse cache, moving the entry to the frequent list when the entry is in a recent list, wherein the candidate entry promoted to the main cache is in the frequent list.

12. The method of claim 11, further comprising evicting an entry from the recent list of the reverse cache after a period of time and when the entry is not accessed a second time.

13. The method of claim 12, further comprising moving the entry from the recent list to the frequent list when the entry is in the recent list and is accessed a second time.

14. A method comprising:
    operating a reverse cache that is configured to identify data to insert into a main cache, wherein the reverse cache is configured to store entries representing the data and wherein the main cache stores data, wherein operating the reverse cache includes:
    determining whether an entry for a requested data is present in a reverse cache;
    when the requested data is not present in the reverse cache, promoting a candidate entry to the main cache and adding the entry for the requested data to the reverse cache, wherein the entry is adjusted in the reverse cache when the entry is present in the reverse cache;
    when the candidate entry is not promoted to the main cache, evicting an old entry from the reverse cache and adding the entry for the requested data to the reverse cache, wherein the old entry is not evicted if the reverse cache has space for adding the entry,
    wherein entries are evicted from the main cache and from the reverse cache based on recency of access, frequency of access, and an adjustment factor configured to prevent entries that are more likely to be accessed from being evicted, wherein the adjustment factor changes timestamps, wherein timestamps for entries that have been accessed more frequently and/or more recently that other entries are adjusted differently than timestamps for entries that have been accessed less frequently and/or less recently.

15. The method of claim 14, further comprising
    managing the main cache by adjusting metadata for entries in the main cache to account for recency values and frequency values associated with the entries in the main cache and evicting entries from the main cache based on the adjusted metadata.

16. The method of claim 15, wherein the metadata comprises timestamps, wherein adjusting the metadata includes changing at least some of the timestamps using an adjusting factor to generate adjusted timestamps, wherein eviction candidates from the main cache are identified based on the adjusted timestamps.

17. The method of claim 16, wherein the adjusting factor is configured such that entries less likely to be accessed are evicted.

18. The method of claim 17, wherein the metadata includes a recency value, a frequency value, a timestamp, and an adjusted timestamp, wherein evicting entries from the main cache further comprises adjusting timestamps of each of the entries to generate adjusted timestamps for each of the entries.

19. The method of claim 14, wherein the reverse cache comprises a frequent list and a frequency list, further comprising, when the entry is present in the reverse cache, moving the entry to the frequent list when the entry is in a recent list, wherein the candidate entry promoted to the main cache is in the frequent list, wherein the entries comprise an index value or a fingerprint.

* * * * *